June 26, 1923.

T. NAGEL 1,459,921

METHOD OF AND APPARATUS FOR THE HYDRODYNAMIC SEPARATION OF PARTICLES

Filed Nov. 7, 1921   4 Sheets-Sheet 1

INVENTOR
THEODORE NAGEL
BY
ATTORNEYS

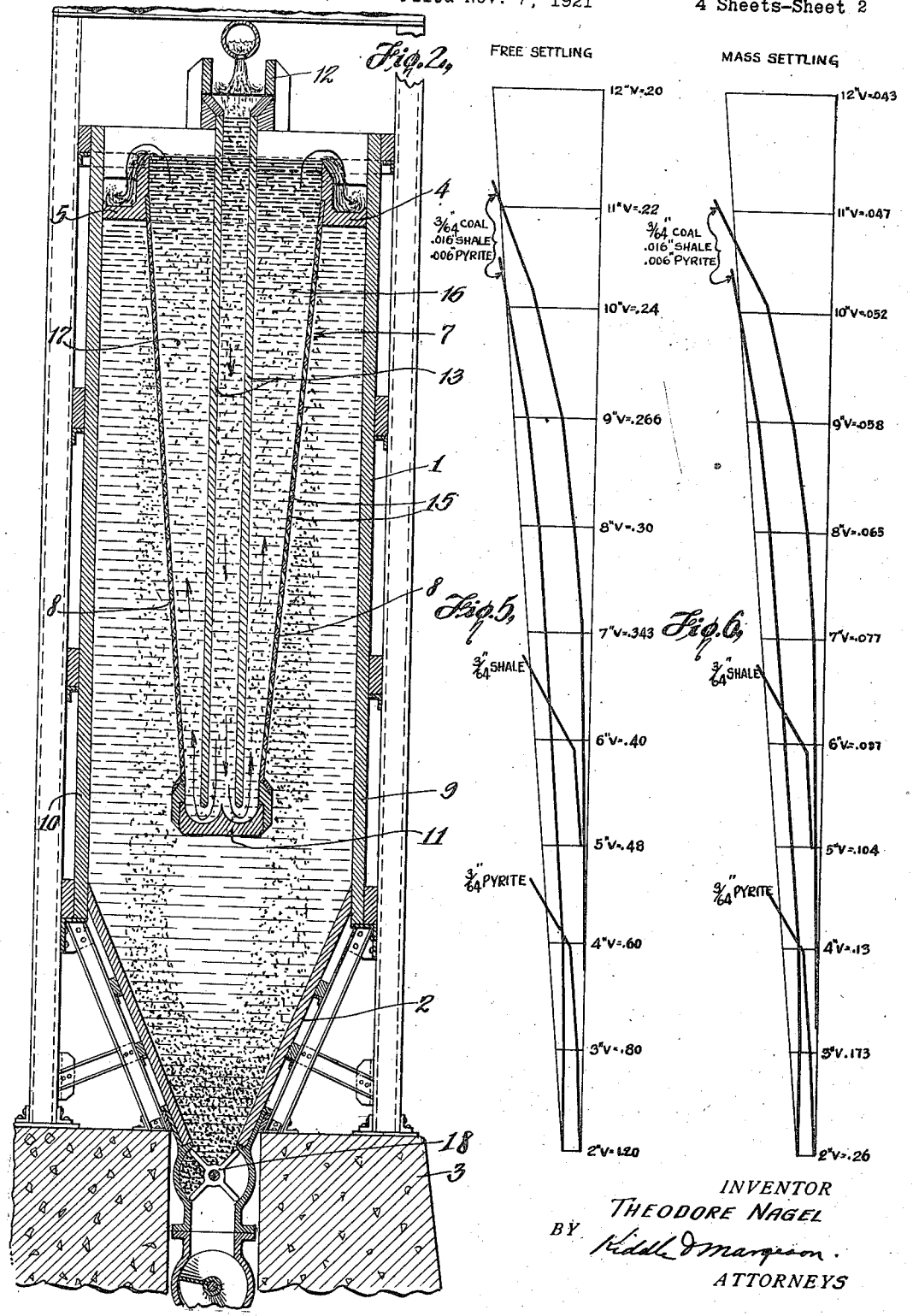

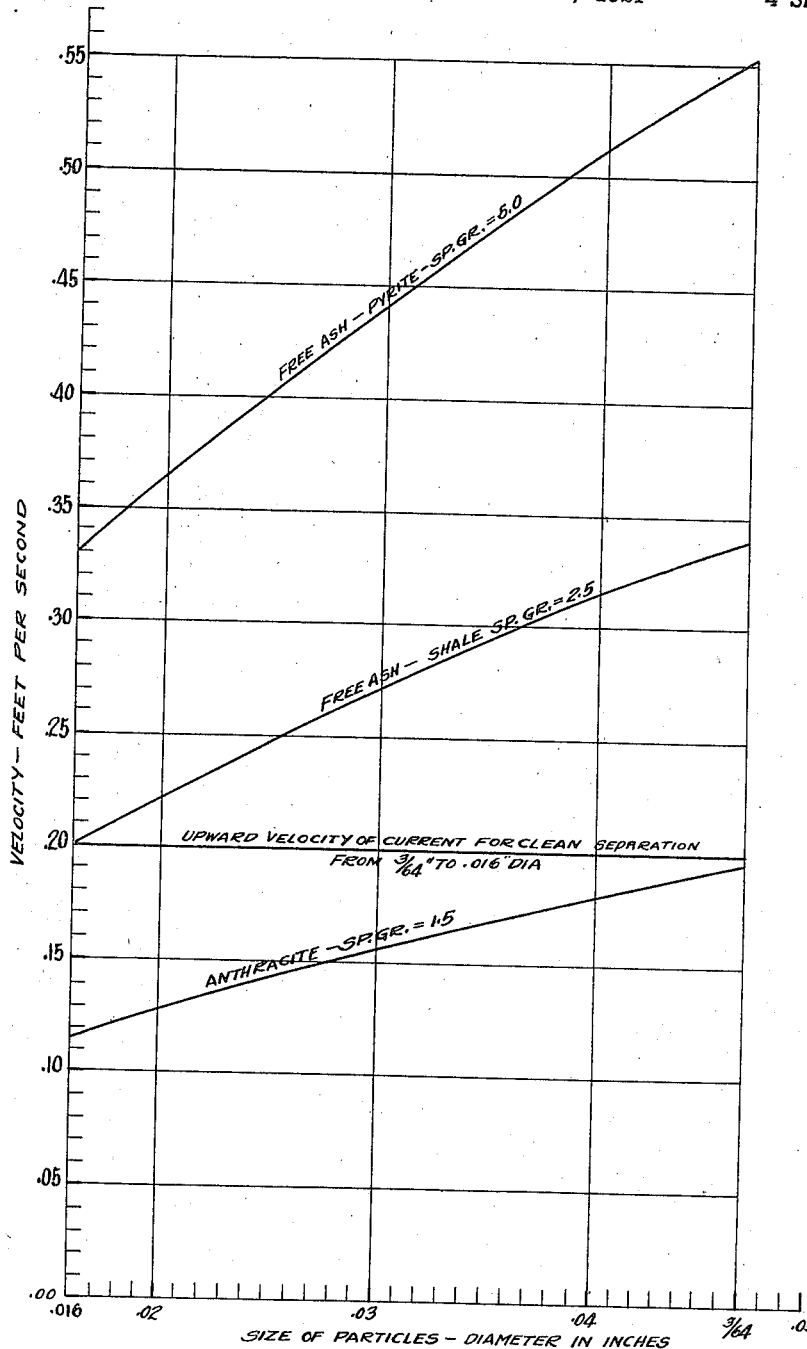

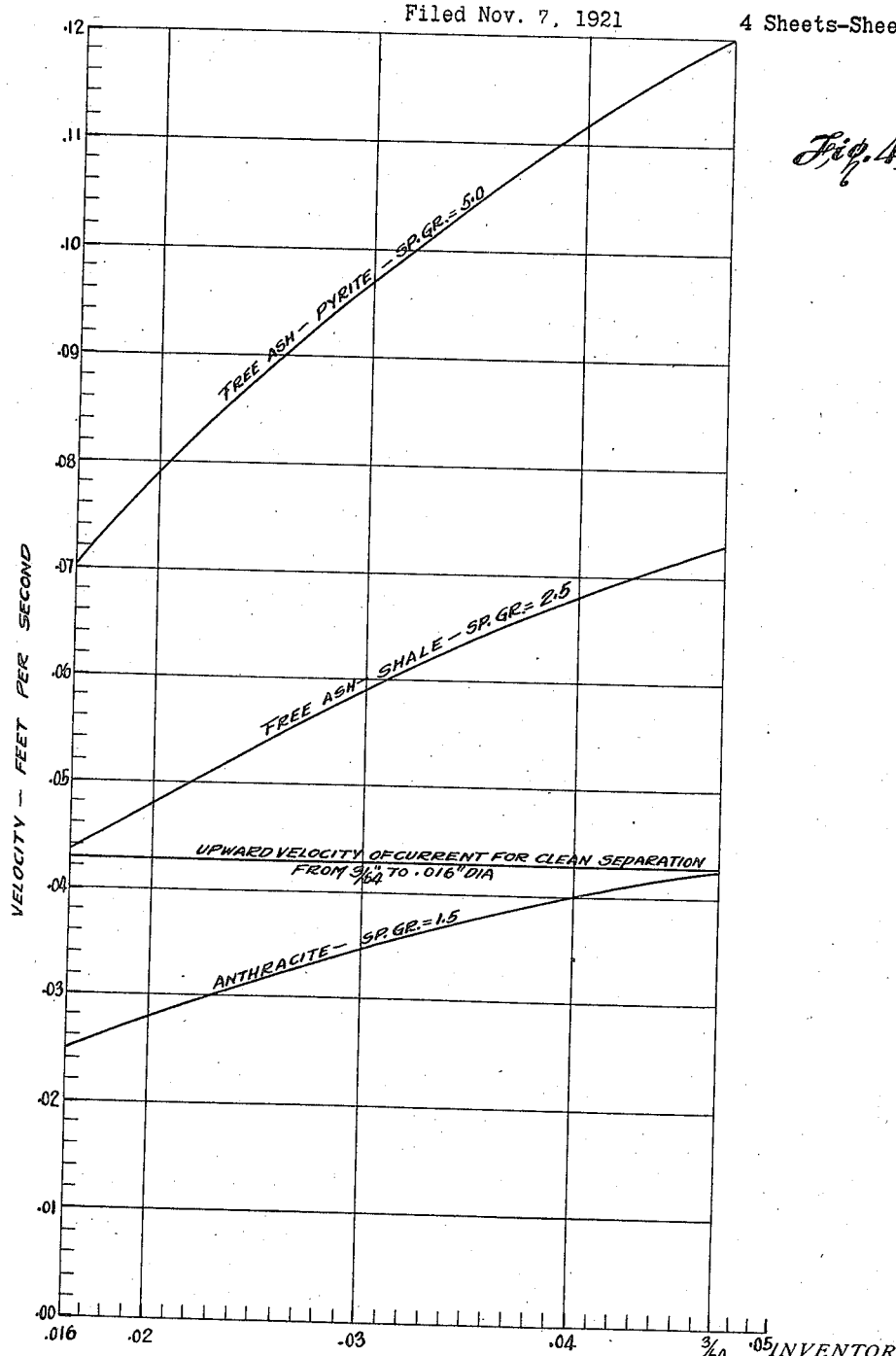

Patented June 26, 1923.

1,459,921

UNITED STATES PATENT OFFICE.

THEODORE NAGEL, OF BROOKLYN, NEW YORK.

METHOD OF AND APPARATUS FOR THE HYDRODYNAMIC SEPARATION OF PARTICLES.

Application filed November 7, 1921. Serial No. 513,236.

*To all whom it may concern:*

Be it known that I, THEODORE NAGEL, a citizen of the United States, and a resident of the borough of Brooklyn, county of Kings, and city and State of New York, have invented certain new and useful Improvements in Methods of and Apparatus for the Hydrodynamic Separation of Particles, of which the following is a specification.

My invention is directed to an improved method of and apparatus for effecting the separation of some of the particles from a mixture of particles contained in a liquid and is adapted for use in connection with the separation of particles of different sizes, or of different specific gravities or of different specific gravities and sizes.

My invention is also directed to an improved method of and apparatus for effecting the separation of particles from a liquid.

It will be seen as this description proceeds that I have described my improved method and apparatus in connection with the separation of the coal from the free ash contained in the water which comes from coal washeries and in connection with the dewatering of the coal thus separated.

Although in the specific illustration of the application of my improved method to be hereinafter described in detail water will be referred to as the liquid medium employed in the working of my improved method, it is to be understood that I am not to be limited to the use of water as the liquid medium nor is my method to be limited to the separation of coal from free ash, but on the contrary, other liquids may be employed and other solids separated with equal facility.

In order that my invention may be clearly understood I will first of all outline the theory thereof, followed by a detailed description of the practical operation of my method in conjunction with an apparatus which for illustrative rather than definitive purposes I have shown in the accompanying drawings.

It is well known that the downwardly acting force inherent in a particle immersed in a liquid is equal to the difference of the weight of the particle in air and the weight in air of an equivalent volume of the liquid medium employed. This inherent force causes the particle, starting from rest, to accelerate its velocity. As the downward velocity of the particle increases the frictional resistance of the liquid medium acting upwardly against the vertically projected area of the surface of the particle also increases, this increase being in proportion to the square of the downward velocity of the particle.

It follows, therefore, that when the upward force produced by the frictional resistance of the liquid medium against the surface of the settling particle equals or balances that part of the downward force accelerating the settling of the particle in the liquid medium, the downward velocity or settling of the particle will become uniform or constant with respect to the liquid medium.

The principles just described are fundamental laws of hydrodynamics.

The constant velocity of settling is expressed by the equation:

(A) $\quad V = K[D(p_d - f_d)]^{\frac{1}{2}}$ in which—

$V$=Constant velocity settling of particle in liquid medium.
$D$=Diameter of particle.
$p_d$=Specific gravity of particle.
$f_d$=Specific gravity of liquid medium.
$K$=Constant which varies according to the shape of the particle, the liquid medium and the percentage mixture of solids with liquid.

Volume of particle varies as the cube of the linear dimension or the cube of the diameter.

From the foregoing the following has been deduced:

The relation of the settling velocities of two particles of equal diameters but of different densities is expressed by the equation:

(B) $\quad \dfrac{V_1}{V_2} = \dfrac{(p_{d_1} - f_d)^{\frac{1}{2}}}{(p_{d_2} - f_d)^{\frac{1}{2}}}$ The relation of the settling velocities of two particles of different diameters but of the same density is expressed by the equation:

(C) $\quad \dfrac{V_1}{V_2} = \left[\dfrac{D_1}{D_2}\right]^{\frac{1}{2}}$

Two particles having the same settling velocity have their diameters and densities vary according to the relation expressed by the equation:

(D) $$\frac{D_1}{D_2} = \frac{K^2_2(p_{d2}-f_d)}{K^2_1(p_{d1}-f_d)}$$

When the particles are practically uniform in shape, such as small spherical particles or small average irregular particles, etc., the relation is expressed by the equation:

(E) $$\frac{D_1}{D_2} = \frac{(p_{d2}-f_d)}{(p_{d1}-f_d)}$$

In the present state of the art of hydraulic separation of one or more materials or one or more sizes of material or materials from two or more materials or two or more sizes of material or materials, using a liquid medium for immersion, the material or materials are introduced at or near the top of the surface of an upwardly moving liquid medium,—that is the mass being treated is fed downwardly into a body of upwardly moving water. In some instances the material is previously wetted with some of the liquid. Of course, in such an operation the downwardly moving particles necessarily pass through the liquid medium carrying particles moving upwardly which tend to interfere in the free movement of each other.

It is fundamental, of course, that the heavier of two uniformly-shaped equally-sized particles of different specific gravities immersed in a liquid has a greater downward vertical uniform settling velocity than the lighter particle. If these two particles are contained in a liquid which has a uniform upward velocity of flow inclined from the vertical, with an upward vertical component of the velocity of flow greater than the uniform downward vertical settling velocity of the particles, it is evident that the more dense particle will not be carried vertically upward as fast as the lighter particle because the constant downward vertical uniform settling velocity is greater for the more dense particle.

It is apparent also that under these conditions the horizontal component of the velocity of flow of the upward moving liquid carries both particles entrained in the moving liquid away from the vertical at approximately the same velocity. Beginning with the same velocity of motion and direction of flow, the two particles travel away from the vertical at approximately the same velocity but the vertical component of the velocity of flow of the lighter particle is greater than the vertical component of the velocity of flow of the heavier particle.

By gradually increasing the angle of inclination from the vertical and maintaining the same uniform velocity of flow throughout the liquid, the vertical component of the velocity of flow of the liquid is gradually decreased and the horizontal component of the velocity of flow of the liquid is gradually increased.

If the area of flow of the liquid be gradually increased, by giving a greater inclination from the vertical to one side of the channel which guides the flow and inclination of the liquid, the velocity of the liquid will be gradually decreased and, during the same interval of time, the angle of inclination from the vertical of the moving liquid is gradually increased, thus imparting a gradual decrease to the vertical component of the velocity of flow of the liquid and during the same interval of time giving a gradual increase to the horizontal component of the velocity of flow of the liquid.

Under these conditions, as the vertical distance is gradually increased from the apex of the angle formed by the two diverging sides of the channel which guides the flow, it is evident that the side with the greater inclination from the vertical increases its horizontal distance from the vertical line, beginning at the apex of the angle formed by the divergence of the two sides of the channel.

Considering the two particles as above described contained in the upward moving liquid and beginning with the same velocity of flow and direction of motion, it is evident that the heavier particle, the direction of motion of which has the greater angle of inclination from the vertical, will reach the side of the channel that guides the flow at a lower point than the lighter particle because both particles, as above pointed out, are moving away from the vertical at approximately the same velocity but the lighter particle has a greater vertical component of velocity of flow than the heavier particle and hence the particle the direction of flow of which is at the greater angle of inclination from the vertical is the slower moving particle.

If the side of the channel that guides the flow, which has the greater angle of inclination from the vertical, contains proper openings establishing communication between the channel of flow and a body of quiescent liquid, it is evident that the slower moving particle will pass out of the upward moving liquid when this particle has reached the side of this channel and when the direction of motion of this particle is inclined far enough from the vertical so that it can pass through one of the said openings into the quiescent liquid, after which it will assume a downward motion in the quiescent liquid body. In other words the slower moving particles will pass out of the upward moving liquid below the point of discharge of the faster moving particles.

It is therefore evident that an apparatus can be so constructed as to regulate the velocity of flow and direction of motion of the moving liquid mixture so that the slower moving particles will pass through the openings of the channel which guides the flow, into the quiescent liquid, as just explained, and not permit the faster moving particles to pass through any of the said openings in the said channel guide but to be carried off with the flowing liquid.

From the relations of settling of immersed particles of various sizes and specific gravities as expressed mathematically by the formulæ A, B, C, D and E, it is evident that there is a critical range of sizes of particles of a mixture of materials of different specific gravities within which there can be effected a predetermined separation of the particles provided the particles be properly controlled as to velocity of flow and direction of motion, as explained above.

While in the moving liquid and while moving out of the current of the moving liquid the particles that are passed out of the moving liquid do not travel in a downward direction but while in the free current of the moving liquid these particles travel in an oblique upward direction which is not lower than the horizontal and consequently are not interfered with or do not tend to interfere with the predetermined motion of the particles from which they are to be separated.

After the vertical upward component of the velocity of the moving liquid is decreased to the critical velocity required for carrying only those particles or that part of the material which is not passed out of the moving liquid the velocity of the moving liquid is maintained at or above this critical velocity.

In the accompanying drawings illustrating an apparatus which may be employed in the practice of my invention,—

Fig. 2 is a sectional elevation of one part of the apparatus shown in Fig. 1;

Figure 1:
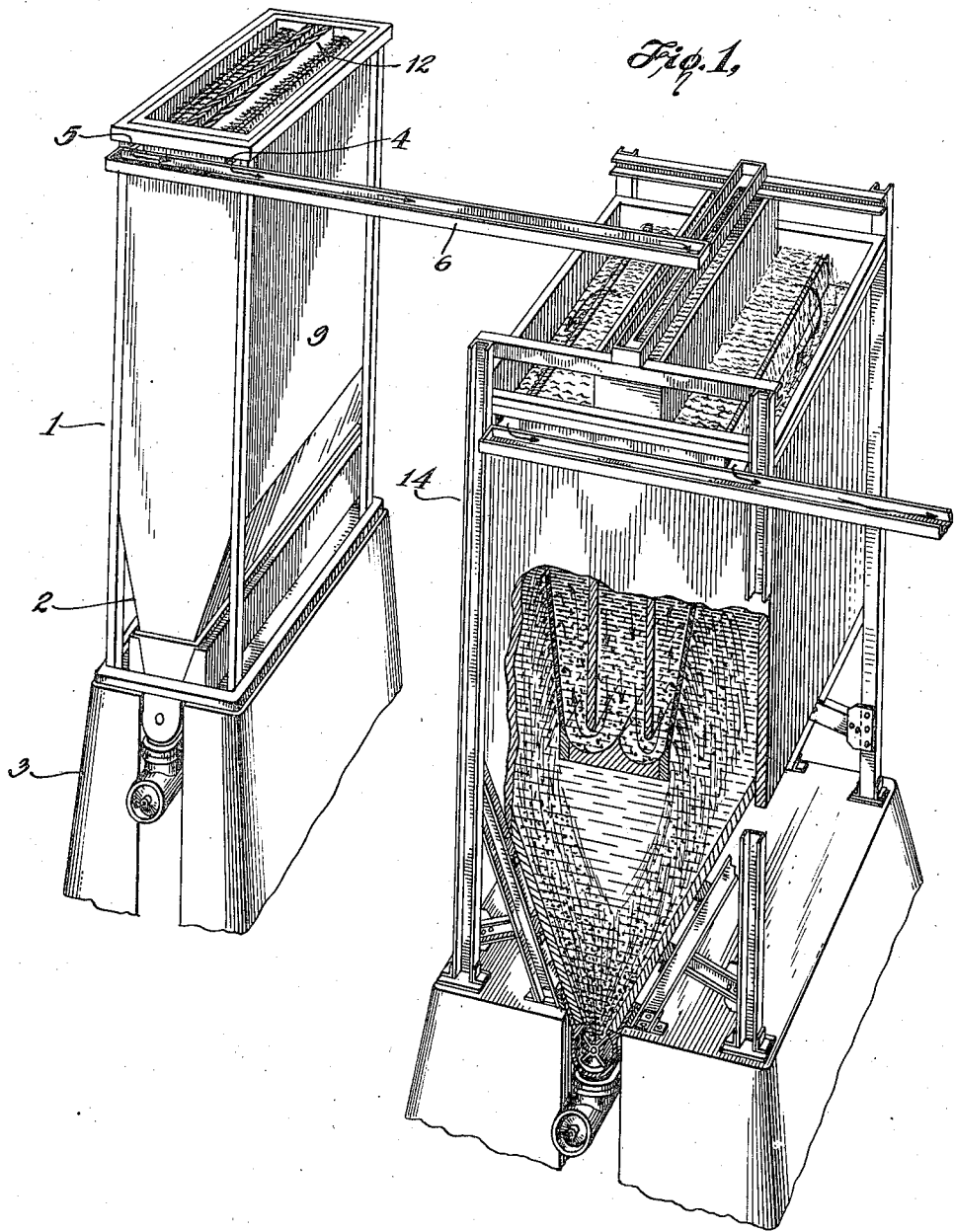
Fig. 1 is a diagrammatic view of my improved apparatus for continuous operation of separating some of the particles from a mixture of particles in a liquid and for dewatering the particles which were not previously passed out of the mixture.

Fig. 3 comprises settling curves for anthracite culm particles (free settling in water);

Fig. 4 comprises settling curves for anthracite culm particles (mass settling in water);

Fig. 5 comprises curves showing the limit of free ash separation from anthracite culm with reference to the apparatus of Fig. 2 (free settling); and Fig. 6 comprises curves showing the limit of free ash separation from anthracite culm with reference to the apparatus of Fig. 2 (mass settling).

As a specific example illustrative of the foregoing, although as above pointed out, without in any way limiting the application of this invention, I will apply the above fundamentals to anthracite culm which consists of a mixture of small particles of anthracite with small particles of free ash composed of shale, slate and pyrite. The specific gravity of this anthracite is 1.5 and the specific gravity of the free ash varies from 2.5 for shale to 5.0 for pyrite. The size of the particles now under consideration varies from 0.047" to 0.016". The velocity settling curves for these particles for free settling (see Fig. 3) and mass settling (see Fig. 4) show that the characteristics of the curves are identical, that is to say the velocities of free settling for all the particles are approximately 4.6 times faster than for mass settling of these respective particles.

It is also apparent from the curves for free settling (see Fig. 3) that if the water has an upward velocity of substantially 0.20 feet per second that the coal particles will move upwardly and the free ash particles will move downwardly. For mass settling (see Fig. 4) the upward velocity of the water must be approximately 0.043 feet per second to effect the same relative motions of the coal and free ash particles.

It is therefore apparent that for practically any reasonable percentage of a mixture of the anthracite culm in water referred to there is a critical upward velocity of the water ranging between the limits of 0.043 feet per second and 0.20 feet per second where the coal particles will move upwardly and the free ash particles will move downwardly.

In this illustration for anthracite culm it will be seen, therefore, that with particles ranging between 0.047" and 0.016" there is a critical upward velocity of the water whereby within reasonable percentage limits of mixture practically all the anthracite particles will be moved upwardly while practically all the free ash particles will move downwardly.

Referring now to the drawings in detail and particularly to Figs. 1 and 2,—1 designates a rectangular tank provided with a sloping bottom 2. The tank may be suitably supported upon a foundation 3. The upper part of the tank is provided with overflow troughs 4 and 5, these troughs being secured to the sides of the tank adjacent the top thereof in any suitable manner. The end of each of the troughs 4 and 5 is open and communicates with a conveying trough or channel 6.

Mounted within the tank 1 is a device designated 7 which I shall refer to hereinafter as a guide for controlling the flow of the mixture of particles and a liquid. This guide extends from end to end of the tank and comprises sloping sides 8 spaced from the side walls 9 and 10 thereof. These sloping walls project downwardly from the troughs 4 and 5 into the tank and at the lower ends of these inclined members 8 I provide a bottom member 11. The guide therefore may be said to be a channel extending from end to end of the tank 1, having a closed bottom 11 and with an open top.

Mounted above the top of the tank and running from end to end thereof is a feed hopper designated 12. This hopper is connected to a pair of downwardly-extending members or partitions 13, these members being spaced from each other and extending from end to end of the tank. The spacing of these members from each other forms in effect a feed channel through which the mixture of particles and a liquid may pass from the feed hopper 12 to a point adjacent the bottom of the guides 7.

The apparatus so far described is that employed for the separation of some of the particles from a mixture of particles and a liquid as will be hereinafter described more in detail. The trough 6 heretofore referred to leads to a device shown in Fig. 1 and designated 14. This device is in all essentials similar in principle to the device of Fig. 2 and is employed for the dewatering of the material which is discharged from the device 7 into the troughs 4 and 5. Of course in order that the material from the troughs 4 and 5 may flow to the device 14 it is essential that the latter be placed below the trough 6.

I will now proceed to describe the operation of this apparatus in connection with anthracite culm from coal washeries which as above pointed out is composed of anthracite particles and free ash particles. The tank 1 is first filled with a liquid such as water for example. By reason of the fact that the inclined walls 8 of the guide 7 are provided with proper openings which I will designate 15, the water in the tank 1 will of course flow into the spaces 16 and 17 of the device 7 and between the members 13: in other words, at the outset the whole apparatus is filled with water. The coal washery water, we will assume for example, contains 15 per cent solids which we have heretofore referred to as culm, to wit, anthracite particles and free ash particles and the washery water is fed from the hopper 12 through the feed channel provided by the spacing of the members 13. Due to the fact that the hopper 12 is above the top of the troughs 4 and 5 it is possible to create any desired differential in head pressure of the moving mixture of particles and a liquid which pressure permits a predetermined velocity of flow of the moving mixture to be maintained.

As the moving mixture reaches the bottom of the feed channel it passes beneath the members 13 and is then projected upwardly through the quiescent body of water within the tank, the moving mixture, of course, passing upwardly between the members 13 and the inclined members 8 of the guide 7: in other words, passing upwardly through the spaces which I have heretofore designated 16 and 17. At the beginning of the upward movement of the mixture through the spaces 16 and 17 the particles move upwardly at the same velocity of flow and in the same direction of motion. As this upward movement of the particles continues it will be apparent from the explanation given in the first part of this description that the vertical velocity of flow of some of the particles will be decreased with respect to the vertical velocity of flow of the other particles of the moving mixture. However, as I have above pointed out, as the mixture moves upwardly the area of the upwardly moving mixture is gradually increased, due to the inclined members 8, which increase in area of flow of the mixture not only decreases the vertical component of the velocity of flow of some of the upwardly moving particles with respect to the vertical component of the velocity of flow of the other particles, but gradually imparts to all of the particles a horizontal component of velocity of flow. This motion of the particles is indicated in Fig. 5. If, now, as I have just pointed out, the vertical component of the velocity of flow of some of the particles of the moving mixture be decreased with respect to the vertical component of the velocity of flow of the other particles of the moving mixture and if a horizontal component of velocity of flow be imparted to all of the particles, it follows that the slower moving particles of the mixture will tend to move at a greater inclination from the vertical than the other particles of the mixture. In other words, the horizontal component of the velocity of the slower moving particles, free ash, is varied relatively to the horizontal component of the velocity of the faster moving particles, carbonaceous particles, and the slower moving particles will impinge against the members 8 and finally when the vertical component of the velocity of the slower moving particles has been sufficiently decreased these particles will pass through the openings in the members 8 and into the quiescent fluid in which the device 7 extends. At the same time, however, the other particles of the moving mixture continue their upward movement until they finally overflow at the top of the device 7 into the troughs 4 and 5 from which they pass into the trough 6 and are conveyed thereby to the device 14. The particles which have passed through the openings in the inclined members 8 settle through the quiescent water in the tank 1 and concentrate and are removed from the bottom of tank 1 by a rotary valve 18 which conducts them out of the tank entirely.

It will be seen, therefore, that so far as the apparatus of Fig. 2 is concerned I have provided a means whereby some of the particles of a mixture of particles in a liquid may be separated from the other particles of the mixture by properly controlling the velocity of flow and direction of motion of the mixture to cause the materials of the mixture to travel at different velocities and the slower moving material to pass out of the mixture below the exit of the other material.

It will be seen that the material which has been discharged into the troughs 4 and 5 consists of—in the present example—anthracite particles and water and I find it expedient in the one continuous process to dewater this mixture. The device as I have above pointed out for dewatering this mixture is similar in principle to the device of Fig. 2. In other words, the water and anthracite particles are fed into the device 14 by the trough 6 and are then projected upwardly through a quiescent liquid, the velocity of flow and direction of motion of this mixture which is now merely water and anthracite particles, being so controlled and directed as to cause the anthracite particles to pass out of the moving mixture into the quiescent liquid contained in the device 14, through which they settle and concentrate and may be discharged from the bottom as desired in a concentrated form by a valve similar to the valve 18 of Fig. 2.

It will be seen from the foregoing that I have provided what may be termed a hydrodynamic method of separating some of the particles from a mixture of particles contained in a liquid wherein the mixture is projected through a body of quiescent water and wherein the velocity of flow and direction of motion of the particles in the mixture are so controlled and directed as to cause some of the particles of the mixture to pass from under the hydraulic influence of the moving mixture and into the hydrostatic influence of a body of quiescent liquid, the remaining particles of the moving mixture being discharged from the apparatus.

It will be seen also that in order that my invention may be realized I have provided an apparatus whereby the mixture may be handled as just described and whereby the moving mixture is so controlled and directed as to bring about the predetermined separation. This separation is effected by gradually increasing the area of the moving mixture to decrease the vertical component of velocity of flow of some of the particles of the mixture with respect to the vertical component of velocity of flow of the other particles of the mixture while during the same time a horizontal component of the flow is imparted to particles of the moving mixture. This greater inclination from the vertical of the flow of some of the particles of the moving mixture effects the passing of these particles of the mixture from under the hydraulic influence of the moving mixture into the hydrostatic influence of the quiescent liquid body and prevents the passing of the other particles of the mixture from under the hydraulic influence of the moving mixture.

As I have pointed out in the first part of this description, it is to be clearly understood that the materials mentioned specifically in the detailed description of the practice of my invention have been mentioned by way of illustration only.

It will be seen that throughout the description I have used the word "mixture." It is to be understood that this word is to be interpreted to mean a mass comprising a liquid containing particles of a material or materials.

It is also to be understood that apparatus other than that herein illustrated and described may be devised by a person skilled in this art to perform my improved method without departing from the spirit and principles of my invention.

What is claimed as new is:

1. The method of separating a material from a mixture of two materials and a liquid which method consists in projecting the mixture upwardly through and out of a liquid body to cause the materials of the mixture to travel at different velocities and the slower moving material to pass out of the mixture below the exit of the other material.

2. The method which consists in projecting a mixture of two materials and a liquid upwardly through a substantially quiescent liquid body and while the mixture is so moving gradually increasing the area thereof to gradually decrease its velocity to cause the direction of motion of one of the materials of the mixture to be deflected at a greater inclination from the vertical than the other material of the mixture and while still maintaining the upward movement of the mixture to cause the material which is moving at the greater inclination from the vertical to be discharged out of the moving mixture, the other material continuing its upper movement and finally being discharged from the quiescent liquid above the point at which the first material is discharged therefrom.

3. The hydrodynamic method of separating one material from a mixture of two or more materials and a liquid which method consists in projecting the mixture upwardly through and in contact with a quiescent liquid body while gradually decreasing the velocity of flow of the mixture to effect a gradual decrease in velocity of one of the materials of the moving mixture with respect to the velocity of the other material or materials, to cause the slower moving material to pass out of the quiescent liquid body, the other material or materials continuing upwardly and finally discharging from the quiescent liquid above the point of discharge of the first material discharged.

4. The hydrodynamic method of separating a material from a mixture of two materials and a liquid, which method consists in projecting the mixture upwardly through and out of a body of substantially quiescent liquid, the area of the moving mixture as it passes through the quiescent liquid being gradually increased to effect a gradual decrease in velocity of one of the materials of the mixture with respect to the velocity of the other material of the mixture so that the slower moving material is passed out of the quiescent liquid at a point below the point of discharge of the other material.

5. The method of separating carbonaceous particles from free-ash particles all contained within a liquid, which method consists in projecting the mixture upwardly through and out of a liquid body to vary the horizontal component of the velocity of the free-ash particles with respect to the carbonaceous particles so as to pass the free-ash particles out of the liquid body at a point below the point of discharge of the carbonaceous particles.

6. The hydrodynamic method of separating coal particles from free ash particles which method consists in projecting a mixture of coal and free ash particles and water upwardly through and out of a body of substantially quiescent water while gradually increasing the area of the mixture to gradually decrease the vertical component of the velocity of motion of the free ash particles with respect to the vertical component of the velocity of motion of the coal particles and to impart a horizontal component of velocity of motion to the free ash particles so as to pass the free ash particles out of the quiescent water at a point below the point of discharge of the coal particles.

7. In an apparatus of the class described, the combination of a container, a liquid therein, a device extending into said container and into the liquid contained therein, said device being provided with inclined sides having openings whereby communication is maintained between the interior of said device and the liquid in said container, and means for feeding a mixture of particles and a liquid upwardly through said device to effect a passing of the particles out of said device and into the liquid first mentioned.

8. In an apparatus of the class described, the combination of a container, a liquid body therein, a device extending into said liquid body and provided with inclined sides having openings whereby communication is maintained between the interior of said device and said liquid body, and spaced members extending upward but spaced from the bottom of said device to provide a feed channel for feeding a mixture of particles into said device and upwardly through said liquid body.

9. The continuous method of separating carbonaceous particles from free ash particles, all contained in water, and the dewatering of the carbonaceous particles, which method consists in projecting the mixture of carbonaceous particles and free ash and water upwardly through and out of a substantially quiescent liquid body, the velocity of the free ash particles with respect to the velocity of the carbonaceous particles being gradually decreased to project the free ash particles out of the quiescent liquid body at a point below the point of discharge of the carbonaceous particles and water from the quiescent liquid body, then projecting the mixture of carbonaceous particles and water through another liquid body to effect a separation of the carbonaceous particles from the water.

This specification signed this 4th day of November, 1921.

THEODORE NAGEL.